United States Patent [19]

Matsubara et al.

[11] 4,119,582
[45] Oct. 10, 1978

[54] PROCESS FOR MANUFACTURING HIGH-RESILIENT FLEXIBLE URETHAN FOAMS

[75] Inventors: Kiyoshi Matsubara; Yuichi Nomura; Tadashi Yatomi; Tadashi Hamamura; Isao Noda; Terumi Watanabe, all of Yokohama; Takao Nomura, Nagoya; Isao Sakata, Toyoda, all of Japan

[73] Assignees: Mitsui-Nisso Corporation; Nippon Unicar Company, Limited, both of Tokyo; Toyota Jidosha Kogyo Kabushiki Kaisha, all of Japan

[21] Appl. No.: 656,979

[22] Filed: Feb. 10, 1976

[30] Foreign Application Priority Data

Feb. 11, 1975 [JP] Japan ................................ 50/17295

[51] Int. Cl.$^2$ .......................... C08G 18/63; C08K 5/54
[52] U.S. Cl. ...................................... 521/112; 521/137; 521/904
[58] Field of Search ................... 260/2.5 AH, 2.5 BE

[56] References Cited

U.S. PATENT DOCUMENTS

| 2,834,748 | 5/1958 | Bailey | 260/2.5 AH |
| 3,471,465 | 10/1969 | Loen | 260/2.5 AH |
| 3,741,917 | 6/1973 | Morehouse | 260/2.5 AH |

FOREIGN PATENT DOCUMENTS 785,835  5/1968  Canada ............................... 260/2.5 BE

OTHER PUBLICATIONS

"Niax Polyol 31-45, a Vinyl-Resin-Reinforced Polyol for Flexible Urethane Foam"; Union Carbide Corp.; published 1970; #F-41322A.

Primary Examiner—C. Warren Ivy
Attorney, Agent, or Firm—Sherman & Shalloway

[57] ABSTRACT

A process for manufacturing high-resilient flexible urethan foams characterized by, reacting and foaming polyalkylene ether polyol and an organic polyisocyanate in the presence of a blowing agent, a surfactant and catalyst, (1) using as said polyalkylene ether polyol one which contains 2 to 10% by weight of a vinyl type polymer and in which its hydroxyl number ranges from 25 to 60 mg KOH/g, of its hydroxyl groups 20 to 70 mol% are primary hydroxyl groups and the remaining hydroxyl groups are secondary hydroxyl groups; (2) using as said organic polyisocyanate a mixture of tolylene diisocyanate with diphenylmethane diisocyanate or a crude diphenylmethane diisocyanate; and (3) using as said surfactant a mixture of a high-molecular-weight siloxane-oxyalkylene copolymer with a low-molecular-weight siloxane-oxyalkylene copolymer.

7 Claims, No Drawings

PROCESS FOR MANUFACTURING HIGH-RESILIENT FLEXIBLE URETHAN FOAMS

The present invention relates to a process for the manufacture of flexible urethan foams and particularly high-resilient flexible urethane foams having an improved humidity resistance.

A flexible urethan foam has a moderate resilience and is excellent in impact absorption and moreover inexpensive, and consequently is widely used for bedding, seat-cushioning in motor cars, furniture cushions, etc. A flexible urethan foam has been so far manufactured by slab foaming or hot mold foaming. In slab foaming, after the completion of foaming, the slab is heated and cured about 30 minutes in an oven at 130° to 150° C. And in hot mold foaming, the mold heated to 50° to 60° C. is charged with raw materials and after heating for 10 to 20 minutes in an oven maintained at 200° to 300° C., foamed materials are discharged from the mold; further post curing is carried out about 30 minutes in an oven at 130° to 150° C. However, the disadvantage is that in either process, enormous energy is required to heat the oven. Another disadvantage is that since a flexible urethan foam, as compared with latex foam, is less flexible and has a lower resilience, "pleasantness of a luxurious feel when one sinks in a seat" felt when one sits down in latex foam is not obtained. Further, there is the disadvantage that urethan foam is flammable, and in view of the protection of customers, fire retardancy is an important problem in the industry.

In recent years, a cold cure process as a new process for manufacturing flexible urethan foams has been developed. This process comprises reacting and foaming a polyalkylene ether polyol with an organic polyisocyanate either by adding an aromatic polyamine or a polyhydric alcohol, or by using what contains a grafted and/or dispersed vinyl type polymer as polyalkylene ether polyol; then curing the resultant product by allowing it to stand 5 to 15 minutes at room temperature or in an 80° C. atmosphere; and later removing it from the mold.

The above three disadvantages which the conventional flexible foams have so far had was overcome by the development of this new art. However, the disadvantage of this cold-cure process is that foams are susceptible to fatigue under conditions of high humidity and high temperature (hereinafter this phenomenon is referred to as inferior humidity resistance). Hence, it is undesirable to use foams made by this process at a place which tends to be exposed to conditions of high temperature and high humidity for a long time, for instance, for seats in a motor car.

It is one object of the present invention to provide flexible urethan foams excellent in humidity resistance without losing the advantage of the cold-cure process.

Another object of the present invention is to provide a process for the manufacture of fire retardant, high-resilient flexible urethan foams having an improved humidity resistance with little consumption of energy in the manufacture.

These objects of the present invention have been accomplished by the inventors in a process for manufacturing flexible urethane foams by reacting and foaming polyalkylene ether polyol and an organic polyisocyanate in the presence of a blowing agent, a surfactant and a catalyst, characterized by (1) using as said polyalkylene ether polyol one which contains 2 to 10% of a vinyl type polymer, and has an hydroxyl number ranging from 25 to 60 mg KOH/g, 20 to 70 mol% of its hydroxyl groups being primary hydroxyl groups and the remaining hydroxyl groups being secondary hydroxyl groups (2) using as said organic polyisocyanate a mixture of tolylene diisocyanate with diphenylmethane diisocyanate or a crude diphenylmethane diisocyanate and (3) using as said surfactant a mixture of a high-molecular-weight siloxaneoxyalkylene copolymer and a low-molecular-weight siloxaneoxyalkylene copolymer.

The polyalkylene ether polyol is an adduct of a polyhydric alcohol, polyamine, or polyphenol with alkylene oxides. As the alkylene oxide, ethylene oxide and propylene oxide can be used. The amount of these alkylene oxides used is controlled so that the resultant polyalkylene ether polyol has the desired hydroxyl number, and the order of reactions and the ratio of ethylene oxide and propylene oxide to be used are controlled so that the resultant polyalkylene ether polyol has the desired ratio of primary and secondary hydroxyl groups. As the polyhydric alcohol ethylene glycol, diethylene glycol, propylene glycol, dipropylene glycol, glycerin, 1,2,6-hexanetriol, trimethylolethane, trimethylolpropane, triethanolamine, pentaerythritol, α-methyl glucoside, sorbitol, sacharose, etc. can be used. As the polyamine ethylenediamine, diethylenetriamine, phenylenediamine, diaminotoluene, diaminophenylmethane, etc. can be used. As the polyphenol bisphenol A, phenol-formaldehyde precondensates, etc. can be used. The preferable polyalkylene ether polyol has 3 to 4 hydroxyl groups in one molecule and the most preferable polyalkylene ether polyol is one obtained by adding ethylene oxide and propylene oxide to glycerin or trimethylolpropane, in which its hydroxyl number and the primary hydroxyl group content are in a range of desired values.

The polyalkylene ether polyol to be used in the present invention must also contain 2 to 10% by weight, preferably 3 to 6% by weight of a vinyl type polymer. Such polyalkylene ether polyol can be prepared by dissolving a vinyl type monomer in polyalkylene ether polyol and by polymerizing the vinyl type monomer in the polyalkylene ether polyol. In this case, a polyvinyl type polymer is present in the form in which it is grafted to, or dispersed in, polyalkylene ether polyol. As the vinyl type monomer acrylonitrile, styrene, methyl methacrylate, butadiene, isoprene, 1,4-pentadiene, 1,6-hexadiene, 1,7-octadiene, α-methylstyrene, acrylic acid, methacrylic acid, methyl acrylate, methacrylonitrile, acrylamide, N,N-dimethylacrylamide, vinyl acetate, acrylalcohol, butyl acrylate, etc. can be used. The preferable vinyl monomers are acrylonitrile, styrene and methyl methacrylate and among others, the most preferable is acrylonitrile.

As described above, in order to attain the object of the present invention it is necessary that polyalkylene ether polyol contain 2 to 10% of a grafted and/or dispersed vinyl type polymer, and particularly preferable is 3 to 6%. If the content of the vinyl type polymer is less than 2%, it becomes difficult to provide the resultant foam with open-cells and the hardness of the foam becomes insufficient; and if the content of vinyl type polymer exceeds 10% the resultant foam become inferior in its humidity resistance.

In order to attain the object of the present invention, as described above, it is also necessary that the hydroxyl number of polyalkylene ether polyol be in a range of 25 to 60 mg KOH/g and particularly preferable is 35 to 55 mg KOH/g. If the hydroxyl number is less than 25 mg KOH/g the crosslink density of the resultant foam becomes low and thereby its humidity resistance becomes poor; and the hydroxyl number is greater than 60 mg KOH/g it becomes difficult to balance the foaming reaction and it becomes impossible to obtain foams with good open cells, the result being undesirable.

Further, in order to attain the object of the present invention, as described before, it is necessary that of hydroxyl groups of the polyalkylene ether polyol, 20 to 70 mol%, and preferably, 40 to 55 mol%, are primary hydroxyl groups and the remainder are secondary hydroxyl groups. If the content of primary hydroxyl group is less than 20 mol%, it becomes necessary to lengthen curing time or raise curing temperature in curing foams; and if the primary hydroxyl group content is more than 70 mol% foams having good open cells cannot be obtained because the reactivity of polyalkylene ether polyol is too high and humidity resistance becomes poor because the hydrophilic nature of the foam becomes too strong.

The polyalkylene ether polyol to be used in the present invention can also be a mixture of several kinds. For instance, polyalkylene ether polyol having a given content of vinyl type polymer, a given hydroxyl number and a given content of primary hydroxyl groups can be prepared and used in the process of the present invention by mixing in proper amount each of the three materials, polyalkylene ether polyol containing in high concentration a grafted and/or dispersed vinyl type polymer, polyalkylene ether polyol containing mainly a primary hydroxyl group and polyalkylene ether polyol containing mainly a secondary hydroxyl group.

As described before, the organic polyisocyanate to be used in the present invention is a mixture of tolylene diisocyanate with diphenylmethane diisocyanate or a crude diphenylmethane diisocyanate. The particularly preferable organic polyisocyanate is a mixture of tolylene-2,4-diisocyanate and/or tolylene-2,6-diisocyanate with a crude diphenylmethane diisocyanate. Crude diphenylmethane diisocyanate can be obtained by reacting with phosgene the crude diaminodiphenylmethane obtained by reacting aniline with formaldehyde. The reaction product of aniline and formaldehyde contains diaminodiphenylmethane and polyphenylpolyamine in which functional groups are greater than 2. The polyphenylpolyamine consists mainly of a triamine, but a polyamine having a molecular weight higher than triamine is also included. The ratio of these various polyamines present in crude diaminodiphenylmethane is greatly influenced by the ratio of aniline to formaldehyde, starting raw materials of the reaction. A crude diaminodiphenylmethane suitable in manufacturing the crude diphenylmethane diisocyanate to be used in the present invention is one which is prepared using aniline and formaldehyde at a molar ratio of 4:1 to 1.2:1, particularly, 2.5:1 to 1.5:1.

The mixing percentage of tolylene diisocyanate and diphenylmethane diisocyanate or a crude diphenylmethane diisocyanate is 70 to 95% by weight, preferably 80 to 90% by weight of the former and 5 to 30% by weight, preferably 10 to 20% by weight of the latter. If a mixture in which tolylene diisocyanate exceeds 95% by weight is in use, the resultant foams become combustible; and if a mixture in which diphenylmethane diisocyanate or a crude diphenylmethane diisocyanate exceeds 30% is in use, the resultant foams become poor in fatigue resistance (compression set becomes worse) and also the touch becomes poor.

The amount of an organic polyisocyanate used in the present invention is 0.95 to 1.15 times the theoretical amount necessary to react with polyalkylene ether polyol and water when used as a blowing agent (that is, NCO index = 95–115).

In the present invention, as described above, it is necessary to use as a surfactant a mixture of a high-molecular-weight siloxane-oxyalkylene copolymer and a low molecular-weight siloxane-oxyalkylene copolymer.

An example of a high-molecular-weight siloxane-oxyalkylene copolymer (hereinafter called siloxane-oxyalkylene copolymer A) is a hydrolyzable siloxane-oxyalkylene copolymer (hereinafter called siloxane-oxyalkylene copolymer A-I) expressed by the general formula (I)

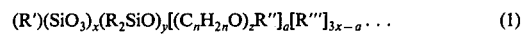

$$(R')(SiO_3)_x(R_2SiO)_y[(C_nH_{2n}O)_zR'']_a[R''']_{3x-a} \cdots \quad (I)$$

where $x$ is an integer of at least 1 and stands for the number of trifunctional silicon atoms; $y$ is an integer of at least 3 and stands for the number of difunctional siloxane units; $z$ is an integer of at least 5 and stands for the length of a polyoxyalkylene chain; $a$ is an integer and stands for the number of polyoxyalkylene units; $n$ is an integer of 2 to 4 and stands for the number of carbon atoms in an oxyalkylene group; R is a monovalent hydrocarbon group, e.g., alkyl or aralkyl; R' is an x-valent hydrocarbon group, e.g., when $x$ is 1, a monovalent hydrocarbon group such as alkyl, when $x$ is 2, a divalent hydrocarbon group such as alkylene, when $x$ is 3, a trivalent hydrocarbon group and when $x$ is 4, a tetravalent hydrocarbon group; R'' is a monovalent hydrocarbon group, e.g., alkyl or aralkyl, forming a monoether group at the end of an alkylene chain; and R''' is an alkyl group or trihydrocarbylsilyl group at an end of a siloxane group, characterized by containing 10 to 80% by weight of polysiloxane units and 90 to 20% by weight of polyoxyalkylene units, having polysiloxane chains and polyoxyalkylene chains bonded with a C—O—Si bond and having a molecular weight of 1,000 to 16,000. Alternatively, as siloxane-oxyalkylene copolymer A in the present invention can also be used a non-hydrolyzable siloxane-oxyalkylene copolymer (hereinafter called siloxane-oxyalkylene copolymer A-II) expressed by the general formula (II)

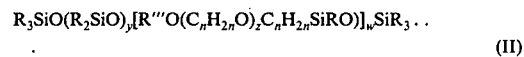

$$R_3SiO(R_2SiO)_y[R'''O(C_nH_{2n}O)_zC_nH_{2n}SiRO)]_wSiR_3 \cdots \quad (II)$$

where $w$ is an integer of at least 1 and $y$, $z$, $n$, R and R''' are the same as defined in the above formula (I), characterized by containing 5 to 95% by weight, preferably 5 to 50% by weight of polysiloxane units and 95 to 5% by weight, preferably 95 to 50% by weight of polyoxyalkylene units, having a polysiloxane chain and a polyoxyalkylene chain bonded with a C—Si bond (instead of a C—O—Si bond) and having a molecular weight of 1,000 to 16,000.

As an example of a low-molecular-weight siloxane-oxyalkylene copolymer (hereinafter called siloxane-oxyalkylene copolymer B) there can be mentioned a hydrolyzable siloxane-oxyalkylene copolymer (hereinafter called siloxane-oxyalkylene copolymer B-I) expressed by the general formula (III)

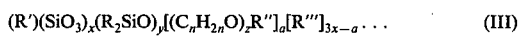

where $x$ is an integer of at least 1 and stands for the number of trifunctional silicon atoms; $y$ is an integer of at least 3 and stands for the number of difunctional siloxane units; $z$ is an integer of 0 or 1 to 4 and stands for the length of a polyoxyalkylene chain; $a$ is an integer and stands for the number of polyoxyalkylene units; $n$ is an integer of 2 to 4 and stands for the number of carbon atoms in an oxyalkylene group; R is a monovalent hydrocarbon group such as alkyl, aryl or aralkyl; R' is an x-valent hydrocarbon group, e.g., when $x$ is 1, a monovalent hydrocarbon group such as alkyl and when $x$ is 2, a divalent hydrocarbon group such as alkylene; R" is a monovalent hydrocarbon group such as alkyl, aryl or aralkyl and forms a mono-ether group at the end of a polyoxyalkylene chain; and R''' is an alkyl group or trihydrocarbylsilyl group at an end of a siloxane group,
characterized by containing more than 80% by weight of polysiloxane units and less than 20% by weight of polyoxyalkylene units, having a polysiloxane chain and a polyoxyalkylene chain bonded with a C—O—Si bond and having a molecular weight of 500 to 10,000. Alternatively, as siloxaneoxyalkylene copolymer B in the present invention can also be used a non-hydrolyzable siloxane-oxyalkylene copolymer (hereinafter called siloxane-oxyalkylene copolymer B-II) expressed by the general formula (IV)

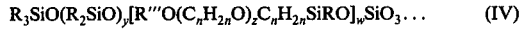

where $w$ is an integer of at least 1, and $y$, $z$, $n$, R and R''' are the same as defined in the above formula (III),
characterized by containing more than 95% by weight of polysiloxane units and less than 5% by weight of polyoxyalkylene units, having a polysiloxane chain and a polyoxyalkylene chain bonded with a C—Si bond (instead of a C—O—Si bond) and having a molecular weight of 500 to 10,000.

In the present invention 0.1 to 10 parts by weight, preferably 0.2 to 5 parts by weight based on 100 parts by weight of polyalkylene ether polyol, of a mixture of siloxane-oxyalkylene copolymer A with siloxane-oxyalkylene copolymer B is used. If the amount used is less than 0.1 part by weight, cells of the resultant foam become coarse; and if it exceeds 10 parts by weight, the resultant foam becomes tight. The mixing percentage of siloxane-oxyalkylene copolymer A and siloxane-oxyalkylene copolymer B is 84.0 to 99.8% by weight, preferably 92.0 to 99.6% by weight of copolymer A and 0.2 to 16.0% by weight, preferably 0.4 to 8.0% by weight of copolymer B. If the percentage of copolymer B is less than 0.2% by weight, only foams with poor air permeability and inferior resilience are obtained; and if it is more than 16% by weight, the activity as a surfactant weakens and foam having "collapse" or "cracks" tends to occur.

In the present invention, as a blowing agent, any blowing agents usually used in the manufacture of flexible urethan foams such as water, monofluorotrichloromethane and methylene chloride can be used in amounts of the well-known range used.

In the present invention, even with the use of only a tertiary amine as a catalyst there can be obtained foams serving the purpose of the present invention and having a good resilience and a good humidity resistance. However, in order to obtain foams having a better humidity resistance and a better green strength, it is desirable to use as catalyst a combination of a tertiary amine and an organic tin compound.

In the present invention, as a tertiary amine there can also be used the triethylenediamine, N,N,N',N'-tetramethylpropylenediamine, N,N,N',N'-tetramethylbutylenediamine, N,N,N',N'-tetramethylhexamethylenediamine, bis(2-N,N-dimethylaminoethyl) ether, N,N-dimethylethanolamine, N,N-diethylethanolamine, N-methylmorpholine, N-ethylmorpholine, triethylamine, etc. which are generally being used in the manufacture of urethan foams, but it is desirable for improving the humidity resistance of urethan foams to use small amounts of a tertiary amine catalyst having as strong an activity as possible. The most preferable tertiary amine catalyst is a combination of triethylenediamine and bis(N-dimethylaminoethyl) ether, and its amount used is preferably 0.05 to 0.08 part by weight of the former and 0.03 to 0.07 part by weight of the latter, based on 100 parts by weight of polyalkylene ether polyol. For conventional cold-cured foams, foaming is conducted with the use of considerably great amounts of amine catalyst, but they are much inferior to the urethan foams manufactured in the present invention in humidity resistance.

As an organic tin compound, stannous octoate and dibutyltin dilaurate are usable, but with the use of stannous octoate can be obtained urethan foams having a particularly excellent humidity resistance. It is desirable to use 0.01 to 0.06 part by weight of the organic tin compound based on 100 parts by weight of polyalkylene ether polyol.

In conducting the molding by the present invention, a mixed solution of polyalkylene ether polyol, an organic polyisocyanate, a blowing agent, a surfactant and a catalyst is poured into a mold heated preliminarily to 40° to 60° C., heated with a heating oven at 100° to 160° C. for 10 minutes and demolded. There is no need to heat the demolded foams for post curing. Since under such conditions, temperature in a heating oven is low and heating time can be reduced, heat energy can be saved and what is more, since the cooling of the mold after mold release is finished in a short time, and next molding can be started, the turnover of a mold is quickened and production efficiency can be increased.

The present invention will be described in more detail by way of examples and referential examples.

The method of measurement of physical properties of foam employed to compare the performance of foam in each example is as follows:

In order that comfort to sit in foams may be compared, ball rebound resiliency and SAG factor are measured. Ball rebound resiliency is a percentage of a rebound distance against a falling distance, of a steel ball dropped on a test piece and is measured by JIS K6401. SAG factor is a magnifying power of a stress when a test piece is compressed 65% to a stress when it is compressed 25% and is measured by JIS K6401. As the resilience of foam becomes higher, both numerical values of ball rebound resiliency and SAG factor increase.

Compression set is measured by JIS K6401 in order that the fatigue resistance of foams may be compared. That is, for fatigue resistance in the dry atmosphere, permanent set after a test piece is allowed to stand under the condition of 75% deflection in the dry air at 70° C. for 22 hours, is measured; and for humidity resistance, permanent set after a test piece is allowed to stand under the condition of 50 or 75% deflection in the air having a humidity of 80% at 60° C. for 22 hours, is measured. The smaller permanent set, fatigue resistance is the better.

Flammability of foam is measured by MVSS-302, a US specification.

And the details of various raw materials to be used in each example and referential example are described below.

1. Polyalkylene ether polyol

PPG-A: polyalkylene ether polyol obtained by subjecting glycerol (hereinafter called GL), propylene oxide (hereinafter called PO) and ethylene oxide (hereinafter called EO) to an addition reaction, in which hydroxyl number is 24 mg KOH/g and the content of a primary hydroxyl group is 80%

PPG-B: polyalkylene ether polyol obtained by subjecting GL, PO and EO to an addition reaction, in which hydroxyl number is 35 mg KOH/g and the content of a primary hydroxyl group is 75%

PPG-C: polyalkylene ether polyol obtained by subjecting GL, PO and EO to an addition reaction, in which hydroxyl number is 56 mg KOH/g and the content of a primary hydroxyl group is 70%

PPG-D: polyalkylene ether polyol obtained by subjecting GL and PO to an addition reaction, in which hydroxyl number is 56 mg KOH/g POP-A: the one in which polyacrylonitrile (hereinafter called AN) is grafted to, and/or dispersed in, PPG-A by about 20%, in which hydroxyl number is 20 mg KOH/g and the content of a primary hydroxyl group is 80%

POP-B: the one in which AN is grafted to, and/or dispersed in, PPG-B by about 20%, in which hydroxyl number is 29 mg KOH/g and the content of a primary hydroxyl group is 75%

POP-C: the one in which AN is grafted to, and/or dispersed in, PPG-C by about 20%, in which hydroxyl number is 43 mg KOH/g and the content of a primary hydroxyl group is 70%

2. Organic polyisocyanate

MDI-TM 15: a mixture of 85 parts of a mixture of the 80:20 tolylene-2,4-diisocyanate and tolylene-2,6-diisocyanate (hereinafter called TDI 80/20) and 15 parts of a crude diphenylmethane diisocyanate (hereinafter called crude MDI), in which the content of —NCO is 45.6%

MDI-TM 30: a mixture of 70 parts of TDI 80/20 and 30 parts of crude MDI, in which the content of —NCO is 43.0%

MDI-TM 20: a mixture of 80 parts of TDI 80/20 and 20 parts of crude MDI, in which the content of —NCO is 44.8%

MDI-TM 10: a mixture of 90 parts of TDI 80/20 and 10 parts of crude MDI, in which the content of —NCO is 46.5%

3. Surfactant

Surfactant A: a surfactant corresponding to the siloxane-oxyalkylene copolymer A-I hereinbefore described, prepared by the following recipe according to a process described in U.S. Pat. No. 2,834,748

| | | |
|---|---|---|
| Triethoxypolydimethyl siloxane (molecular weight: 1500) | 12.8 kg | (8.528 moles) |
| Polyoxyethyleneoxy-propylenemonoalkyl ether (consisting of 50 weight % of ethylene oxide units and 50 weight % of propylene oxide units; molecular weight: 1530) | 39.2 kg | (25.645 moles) |
| Toluene | 32.7 kg | |
| Trifluoroacetic acid | 76.0 g | |
| NaHCO$_3$ | 225 g | |

Surfactant B: a surfactant corresponding to the siloxane-oxyalkylene copolymer B-I hereinbefore described, prepared by the following recipe according to a process described in U.S. Pat. No. 2,834,748

| | | |
|---|---|---|
| Triethoxypolydimethyl siloxane (molecular weight: 1500) | 12.8 kg | (8.528 moles) |
| Ethylene glycol mono-butyl ether | 3.9 kg | |
| Toluene | 32.7 kg | |
| Trifluoroacetic acid | 76.0 g | |
| NaHCO$_3$ | 225 g | |

Surfactant B': stuff on the market similar to the above copolymer B in structure, made by Nippon Unicar Company, Ltd.

Surfactant A': stuff on the market similar to the above copolymer A in structure, made by Nippon Unicar Company, Ltd.

4. Catalyst

Dabco: Triethylenediamine, made by Houdry, Inc.

A-1: bis (2-N-dimethylaminoethyl) ether, made by Union Carbide Corporation

T-9: stannous octoate, made by Metal & Thermit, Inc.

Kaorizer No. 1: N,N,N',N'-tetramethylhexamethylenediamine, made by Kao Soap Co. Ltd.

REFERENTIAL EXAMPLE 1

Polyurethan foam by cold curing was prepared as follows:

Polyalkylene ether polyol, a blowing agent, a surfactant and catalyst in kinds and amounts described in Table 1 were placed in a first container and well mixed with agitation. Then, immediately after organic polyisocyanates in kinds and amounts described in Table 1 were added during agitation, this reaction mixture was rapidly poured into an aluminum mold 400 × 400 × 102 mm preliminarily heated to about 50° C. and expanded. After it was allowed to stand at room temperature for 10 minutes, foams were demolded and crushed through crushing rolls two times at a compressibility of 80%. The measurement results of physical properties of the resultant foams are given in Table 1.

As is seen in Table 1, the polyurethane foam obtained by this recipe is excellent in resilience, fire-resistive, but fatigues very easily and is particularly inferior in humidity resistance.

Table 1

| | | Referential Ex. 1 |
|---|---|---|
| Recipe for formulating raw materials | POP-B | 40 |
| | PPG-B | 60 |
| | Water | 2.7 |
| | Surfactant B' | 1.0 |
| | Dabco | 0.2 |

Table 1-continued

|  |  | Referential Ex. 1 |
|---|---|---|
|  | Kaorizer No. 1 | 0.3 |
|  | MDI-TM 20 (NCO Index 105) | 35.1 |
|  | Content of vinyl type polymer (%) | 8 |
| Details of polyalkylene ether polyol | Content of hydroxyl group (mm KOH/g) | 32.6 |
|  | Content of primary hydroxyl group (mol%) | 75 |
|  | Density (g/cm³) | 0.0403 |
|  | ILD*** (25% deflection) (kg/314 cm²) | 14.6 |
| Physical properties of foam | dry* 75% deflection (%) | 9.2 |
|  | Compres- wet** 50% deflection (%) | 34.1 |
|  | sion set wet** 75% deflection (%) | 71.0 |
|  | Burning test (MVSS-302) | Passing |
|  | Ball rebound resiliency (%) | 55 |

*70° C., 22 hours
**Relative humidity of 80%, 60° C., 22 hours
***Indentation load deflection

EXAMPLES 1 TO 13 AND REFERENTIAL EXAMPLES 2 TO 4

Foams were manufactured with the use of raw materials according to the recipe for the formulation in Table 2 by a process similar to that described in Referential Example 1. However, immediately after the completion of foaming time, the mold was placed in a curing oven at 150° C. and heated for 10 minutes; and the foams were released and crushed through crushing rolls at a compressibility of 80% two times. The measurement results of physical properties of the resultant foams are given in Table 2.

In Referential Examples 2 and 3, the polyalkylene ether polyol described in the present invention was in use, but since as a surfactant, a low-molecular-weight siloxane-oxyalkylene copolymer and a high-molecular-weight siloxane-oxyalkylene copolymer were singly used, respectively, humidity resistance deteriorated in the case of foams in Referential Example 2 and ball rebound resiliency deteriorated in the case of foams in Referential Example 3.

In Referential Example 4, the surfactant in the present invention was in use, but since a vinyl type polymer was not contained in polyalkylene ether polyol, the hardness of foam was not enough and ball rebound resiliency and humidity resistance were inferior.

In contrast, in Examples 1 to 13 where the polyalkylene ether polyol and surfactants of the present invention were in use, a foam having a satisfactory humidity resistance and a good resilience was obtained. In Examples 1, 2, 4 and 6, the influence by hydroxyl number is given. According to these examples, it is found that as the hydroxyl number of polyalkylene ether polyol lowers (as molecular weight increases), humidity resistance tends to slightly deteriorate. However, it is evident that the foams of these examples have been remarkably improved in humidity resistance as compared with those of Referential Examples 1 and 2.

In Example 3, the procedure described in Referential Example 3 was repeated except that a surfactant used in Referential Example 3 was substituted by the surfactant of the present invention. It is found that by using the surfactant of the present invention, it is possible to improve markedly ball rebound resiliency without deteriorating humidity resistance.

In Examples 3 to 5 is shown the influence of an organic tin catalyst (stannous octoate) in the process of the present invention. According to these examples, it is understood that with the increase of the amount of stannous octoate used, humidity resistance is improved.

And it is understood that in comparing Examples 4, 7, 8 and 9, as the content of MDI in the organic polyisocyanate to be used increases, humidity resistance lowers but instead nonflammability tends to increase.

In Examples 6, 10 and 11 are shown influences when the content of a vinyl type polymer in polyalkylene ether polyol has been changed, and it is found that as this content increases, the air permeability and hardness of a cell increase but humidity resistance tends to deteriorate slightly. However, even in Example 11 where the content of a vinyl type polymer is comparatively high (8%), a foam with a much improved humidity resistance is obtained as compared with the cold-cured foam in Referential Example 1.

In Examples 12 and 13 are given influences when a mixing ratio of surfactant A to surfactant B has been changed. According to these examples, it is found that changing this mixture ratio within the range of the present invention does not exert a bad influence on the obtaining of a good foam.

Table 2

|  |  | Examples | | | | | | | |
|---|---|---|---|---|---|---|---|---|---|
|  |  | 1 | 2 | 3 | 4 | 5 | 6 | 7 | 8 |
| Recipe for formulating raw materials | POP-A | 20 |  |  |  |  |  |  |  |
|  | POP-B |  | 20 | 20 | 20 | 20 |  | 20 | 20 |
|  | POP-C |  |  |  |  |  | 20 |  |  |
|  | PPG-A |  |  |  |  |  |  |  |  |
|  | PPG-B | 50 | 50 |  |  |  |  |  |  |
|  | PPG-C |  |  | 50 | 50 | 50 | 50 | 50 | 50 |
|  | PPG-D | 30 | 30 | 30 | 30 | 30 | 30 | 30 | 30 |
|  | Water | 2.7 | 2.7 | 2.7 | 2.7 | 2.7 | 2.7 | 2.7 | 2.7 |
|  | Surfactant A | 0.95 | 0.95 | 0.95 | 0.95 | 0.95 | 0.95 | 0.95 | 0.95 |
|  | Surfactant B | 0.05 | 0.05 | 0.05 | 0.05 | 0.05 | 0.05 | 0.05 | 0.05 |
|  | Surfactant B' |  |  |  |  |  |  |  |  |
|  | Surfactant A' |  |  |  |  |  |  |  |  |
|  | Diethanolamine |  |  |  |  |  |  |  |  |
|  | Dabco | 0.06 | 0.06 | 0.06 | 0.06 | 0.06 | 0.06 | 0.06 | 0.06 |
|  | A-1 | 0.06 | 0.05 | 0.05 | 0.06 | 0.06 | 0.06 | 0.06 | 0.06 |
|  | T-9 | 0.05 | 0.05 | — | 0.02 | 0.04 | 0.02 | 0.04 | 0.02 |
|  | MDI-TM 10 (NCO Index 105) |  |  |  |  |  |  | 37.0 |  |
|  | MDI-TM 15 (NCO Index 105) | 34.7 | 35.9 | 37.7 | 37.7 | 37.7 | 38.2 |  |  |
|  | MDI-TM 20 (NCO Index 105) |  |  |  |  |  |  |  | 38.4 |
|  | MDI-TM 30 (NCO Index 105) |  |  |  |  |  |  |  |  |
| Details of polyalkylene ether polyol | Content of vinyl type polymer (%) | 4 | 4 | 4 | 4 | 4 | 4 | 4 | 4 |
|  | Hydroxyl member mg KOH/g | 32.8 | 40.1 | 50.6 | 50.6 | 50.6 | 53.4 | 50.6 | 50.6 |
|  | Content of primary hydroxyl group (%) | 56 | 53 | 50 | 50 | 50 | 49 | 50 | 50 |
|  | Density (g/cm³) | 0.0411 | 0.0417 | 0.0418 | 0.0410 | 09.0402 | 0.0408 | 0.0415 | 0.0402 |
|  | ILD***** (25% deflection) kg/314 cm² | 17.5 | 19.0 | 19.4 | 19.5 | 20.0 | 18.5 | 19.1 | 18.5 |
| Physical properties | SAG factor | 2.78 | 2.60 | 2.71 | 2.70 | 2.61 | 2.62 | 2.65 | 2.65 |
|  | Compres- dry* 75% deflection (%) | 7.0 | 6.0 | 6.0 | 6.9 | 6.2 | 6.0 | 6.0 | 8.0 |

Table 2-continued

| | | | | | | | | | | | | |
|---|---|---|---|---|---|---|---|---|---|---|---|---|
| of foam | sion set | wet** | 50% deflection (%) | 18.0 | 16.1 | 13.0 | 12.1 | 10.4 | 10.8 | 9.8 | 15.8 | |
| | | wet** | 75% deflection (%) | 21.2 | 17.8 | 13.8 | 12.2 | 11.4 | 11.2 | 12.1 | 18.2 | |
| | Ball rebound resiliency (%) | | | 50.0 | 50.0 | 56.5 | 53.0 | 52.3 | 51.3 | 53.5 | 50.0 | |
| | Burning test (MVSS-302) | | | non*** | non | non | non | non | non | self**** | non | |

| | | Examples | | | | | Referential Examples | | |
|---|---|---|---|---|---|---|---|---|---|
| | | 9 | 10 | 11 | 12 | 13 | 2 | 3 | 4 |
| Recipe for formulating raw materials | POP-A | | | | | | | | |
| | POP-B | 20 | | | 20 | 20 | | 20 | |
| | POP-C | | 30 | 40 | | | 20 | | |
| | PPG-B | | | | | | | | 70 |
| | PPG-C | 50 | 40 | 40 | 50 | 50 | 50 | 50 | |
| | PPG-D | 30 | 30 | 20 | 30 | 30 | 30 | 30 | 30 |
| | Water | 2.7 | 2.7 | 2.7 | 2.7 | 2.7 | 2.7 | 2.7 | 2.7 |
| | Surfactant A | 0.95 | 0.95 | 0.95 | 0.98 | 0.93 | | | 0.95 |
| | Surfactant B | 0.05 | 0.05 | 0.05 | 0.02 | 0.07 | | | 0.05 |
| | Surfactant B' | | | | | | 1.0 | | |
| | Surfactant A' | | | | | | | 0.5 | |
| | Diethanolamine | | | | | | 0.5 | | |
| | Dabco | 0.06 | 0.06 | 0.06 | 0.06 | 0.06 | 0.06 | 0.06 | 0.06 |
| | A-1 | 0.06 | 0.06 | 0.04 | 0.06 | 0.06 | 0.05 | 0.05 | 0.06 |
| | T-9 | 0.02 | 0.02 | 0.02 | 0.02 | 0.02 | 0.05 | | 0.04 |
| | MDI-TM 10 (NCO Index 105) | | | | | | | | |
| | MDI-TM 15 (NCO Index 105) | | 38.0 | 37.8 | 37.7 | 37.7 | 39.2 | 37.7 | 35.4 |
| | MDI-TM 20 (NCO Index 105) | | | | | | | | |
| | MDI-TM 30 (NCO Index 105) | 40.0 | | | | | | | |
| Details of polyalkylene ether polyol | Content of vinyl type polymer (%) | 4 | 6 | 8 | 4 | 4 | 4 | 4 | 0 |
| | Hydroxyl number mg KOH/g | 50.6 | 52.1 | 50.8 | 50.6 | 50.6 | 53.4 | 50.6 | 41.3 |
| | Content of primary hydroxyl group (%) | 50 | 49 | 56 | 50 | 50 | 49 | 50 | 52.5 |
| | Density (g/cm³) | 0.0410 | 0.0408 | 0.0400 | 0.0412 | 0.0406 | 0.0446 | 0.0414 | 0.0383 |
| | ILD ***** (25% deflection) kg/314 cm² | 18.0 | 19.2 | 21.0 | 18.6 | 18.3 | 13.9 | 17.0 | 14.8 |
| | SAG factor | 2.70 | 2.68 | 2.68 | 2.72 | 2.70 | 3.01 | 2.73 | 2.71 |
| Physical properties of foam | Compres- sion set | dry* 75% deflection (%) | 8.8 | 7.0 | 7.5 | 6.2 | 6.4 | 8.6 | 7.9 | 8.2 |
| | | wet** 50% deflection (%) | 18.6 | 14.6 | 18.2 | 12.0 | 12.6 | 28.8 | 14.4 | 18.0 |
| | | wet** 75% deflection (%) | 21.8 | 16.0 | 20.0 | 12.4 | 13.0 | 66.2 | 15.0 | 24.1 |
| | Ball rebound resiliency (%) | | 50.0 | 53.1 | 54.6 | 52.8 | 54.0 | 55.4 | 31.2 | 40.0 |
| | Burning test (MVSS-302) | | non | non | non | non | non | non | non | non |

*70° C., 22 hours
**Relative humidity of 80%, 60° C, 22 hours
non***nonburn
self****self-extinguishing
*****Indentation load deflection

We claim:

1. In a process for manufacturing high-resilient flexible urethan foams by reacting and foaming polyalkylene ether polyol component and an organic polyisocyanate component in the presence of a blowing agent, a surfactant and catalyst, the improvement comprising (1) using, as said polyalkylene ether polyol component, a polyalkylene ether polyol
  (a) containing 2 to 10% by weight of a vinyl polymer which is prepared by dissolving a vinyl monomer in polyalkylene ether polyol and by polymerizing said vinyl monomer in said polyalkylene ether polyol,
  (b) having a hydroxyl number which ranges from 25 to 60 mg KOH/g, and
  (c) having a primary hydroxyl group content of 20 to 70 mol% and the remaining hydroxyl groups being secondary hydroxyl groups;

(2) using, as said organic polyisocyanate component, a mixture of tolylene diisocyanate with either diphenylmethane diisocyanate or a crude diphenylmethane diisocyanate; and (3) using, as said surfactant, a mixture of a high-molecular-weight siloxane-oxyalkylene copolymer with a separately prepared low-molecular-weight siloxane-oxyalkylene copolymer, said high-molecular-weight siloxane-oxyalkylene copolymer being a hydrolyzable siloxane-oxyalkylene copolymer expressed by the general formula

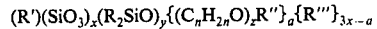

wherein $x$ is an integer of at least 1; $y$ is an integer of at least 3; $z$ is an integer of at least 5; $a$ is an integer of 1 to $3x$; $n$ is an integer of 2 to 4; R is a monovalent hydrocarbon group; R' is an x-valent hydrocarbon group; R" is a monovalent hydrocarbon group; and R'" is an alkyl group or trihydrocarbylsilyl group, said copolymer containing 10 to 80% by weight of polysiloxane units and 90 to 20% by weight of polyoxyalkylene units, having polysiloxane chains and polyoxyalkylene chains bonded with a C—O—Si bond and having a molecular weight of 1,000 to 16,000 and said low-molecular-weight siloxane-oxyalkylene copolymer being a hydrolyzable siloxane-oxyalkylene copolymer expressed by the formula

wherein $x$ is an integer of at least 1; $y$ is an integer of at least 3; $z$ is an integer of 0 or 1 to 4; $a$ is an integer of 1 to $3x$; $n$ is an integer of 2 to 4; R is a monovalent hydrocarbon group; R' is an x-valent hydrocarbon group; R" is a monovalent hydrocarbon group; and R'" is an alkyl group or trihydrocarbylsilyl group, said copolymer containing more than 80% by weight of polysiloxane units and less than 20% by weight of polyoxyalkylene units, having polysiloxane chains and polyoxyalkylene chains bonded with a C—O—Si bond and having a molecular weight of 500 to 10,000.

2. The process as set forth in claim 1 wherein the polyalkylene ether polyol is a product obtained by adding ethylene oxide and propylene oxide to glycerin or trimethylolpropane.

3. The process as set forth in claim 1 wherein the vinyl polymer is a polymer of acrylonitrile, styrene or methylmethacrylate.

4. The process as set forth in claim 1 wherein the organic polyisocyanate is a mixture consisting of tolylene-2,4-diisocyanate, tolylene-2,6-diisocyanate and a crude diphenylmethane diisocyanate.

5. The process as set forth in claim 1 wherein the organic polyisocyanate is used in amounts 0.95 to 1.15 times the theoretical amount necessary to react with polyalkylene ether polyol and a blowing agent.

6. The process as set forth in claim 1 wherein said organic polyisocyanate component (2) is a mixture of 70 to 95% by weight of tolylene diisocyanate with 5 to 30% by weight of either diphenylmethane diisocyanate or a crude diphenylmethane diisocyanate, and said surfactant (3) is a mixture of 84.0 to 99.8% by weight of the high-molecular-weight siloxane-oxyalkylene copolymer with 0.2 to 16.0% by weight of the low-molecular-weight siloxane-oxyalkylene copolymer.

7. The process as set forth in claim 1 wherein said polyalkylene ether polyol component (1) is a polyalkylene ether polyol containing 3 to 6% by weight of a vinyl polymer which is prepared by dissolving a vinyl monomer in polyalkylene ether polyol and by polymerizing said vinyl monomer in said polyalkylene ether polyol and in which its hydroxyl number ranges from 35 to 55 mg KOH/g, of its hydroxyl groups 40 to 55 mol% is a primary hydroxyl group, said organic polyisocyanate component (2) is a mixture of 80 to 90% by weight of tolyene diisocyanate with 10 to 20% by weight of either diphenylmethane diisocyanate with 10 to 20% by weight of either diphenylmethane diisocyanate or a crude diphenylmethane diisocyanate, and said surfactant (3) is a mixture of 92.0 to 99.6% by weight of the high-molecular-weight siloxane-oxyalkylene copolymer with 0.4 to 8.0% by weight of the low-molecular-weight siloxane-oxyalkylene copolymer.

* * * * *